United States Patent [19]
Ryan

[11] 3,839,870
[45] Oct. 8, 1974

[54] OFF-SHORE OIL WELL LEAKAGE CONFINER

[76] Inventor: Margaret M. Ryan, 10549 S. Bell, Chicago, Ill. 60643

[22] Filed: Jan. 21, 1974

[21] Appl. No.: 435,220

[52] U.S. Cl. ............................................. 61/1 F
[51] Int. Cl. ........................................ E02b 15/04
[58] Field of Search..... 61/1 F, 5; 210/242, DIG. 21

[56] References Cited
UNITED STATES PATENTS

| | | | |
|---|---|---|---|
| 3,567,019 | 3/1971 | Headrick | 61/1 F X |
| 3,630,033 | 12/1971 | Tuttle | 61/1 F |
| 3,708,983 | 1/1973 | Brown et al. | 61/1 F |
| 3,752,317 | 8/1973 | Lithen | 210/242 |
| 3,764,015 | 10/1973 | Rolfson | 61/1 F X |
| 3,779,020 | 12/1973 | Muramatsu | 61/1 F |

FOREIGN PATENTS OR APPLICATIONS

| | | | |
|---|---|---|---|
| 843,131 | 8/1960 | Great Britain | 61/1 F |
| 816,440 | 7/1959 | Great Britain | 61/1 F |

*Primary Examiner*—Mervin Stein
*Assistant Examiner*—David H. Corbin
*Attorney, Agent, or Firm*—Mann, Brown, McWilliams & Bradway

[57] ABSTRACT

The invention relates to an oil confining enclosure for an offshore oil well to provide a barrier against the escape of oil leaking from the drilling operation and includes a floating, generally circular, confining wall encircling an offshore well site and which is supported on a series of interconnected pontoons having operative connection with a floating platform, exteriorly of the confining wall, providing control valves for the connections to the pontoons whereby a vessel may approach the floating platform and by means of the valved connections to the pontoons cause the pontoons to be filled with sea water to sink the confining wall below the level of the sea for access by the vessel to the drilling rig and on the way out again connect with the floating platform valves to blow the water out of the pontoons for the flotation of the circular confining wall.

3 Claims, 2 Drawing Figures

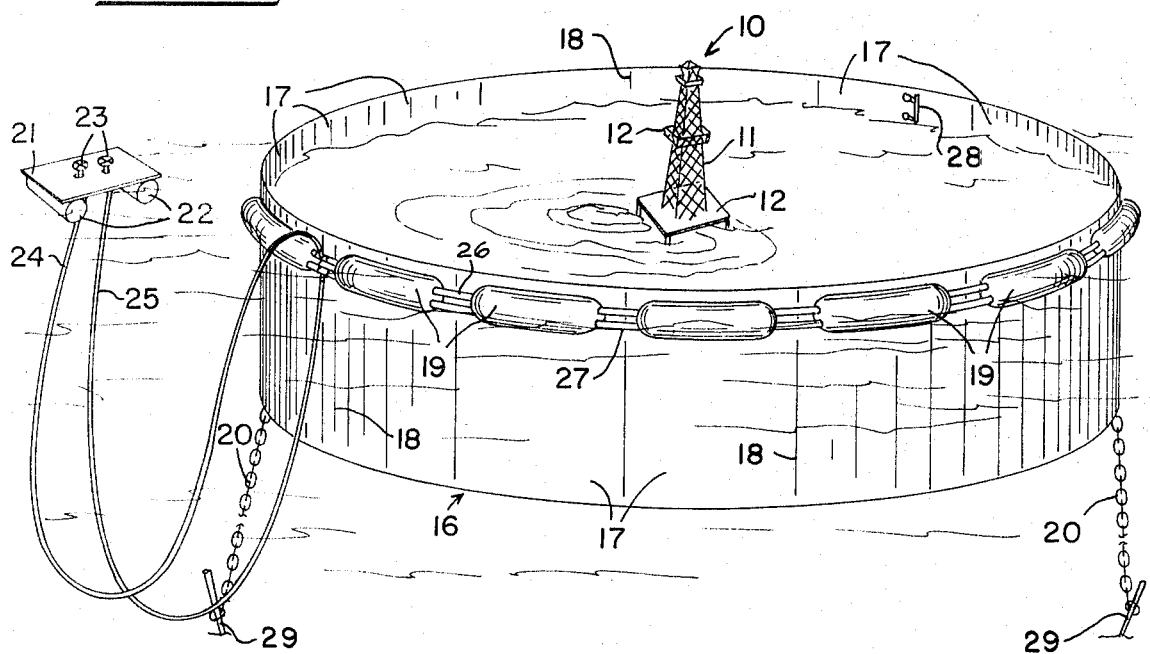
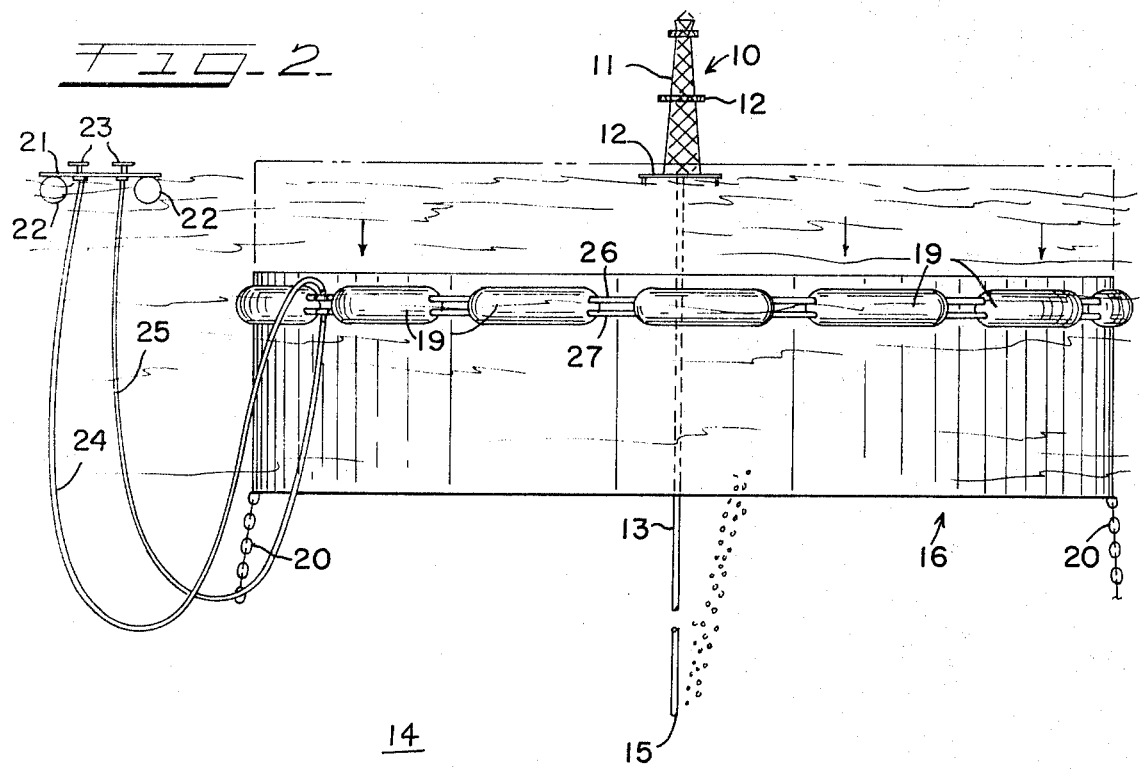

OFF-SHORE OIL WELL LEAKAGE CONFINER

BACKGROUND OF THE INVENTION

Prior art disclosures reveal various apparatus for avoiding water pollution by oil leak detecting devices, by oil spill confining arrangements and removing oil slicks from water surfaces which may have resulted from ships offshore having lost a quantity of oil for one reason or another. Air discharge apparatus have been proposed for discharging what was intended to provide a barrier against the escape of leaking oil by issuing a continuous stream of air from below water level around an oil slick for the purpose of confining the oil within a desired area. Many attempts have been made at providing arrangements proposed for skimming oil from the surface of a body of water. However, while many offshore oil well drilling operations have taken place in recent years and efforts have been made to avoid oil leakage or spills, no successful solution has been found for escaping from this continuing problem. Oil leaks occur and clean-up operations are conducted with whatever apparatus that may be available and which offers any degree of success in removing at least some portion of the spill.

SUMMARY OF THE INVENTION

The apparatus of the present invention affords an arrangement which provides positive means for confining the oil on the surface of a body of water that has leaked or escaped from an offshore oil well drilling operation. The invention includes a generally circular wall of continuous construction which may be fabricated on the site by securing a series of plates in edge to edge relationship or the complete wall structure might be lowered around an offshore oil well installation, as by helicopter and secured in position concentrically around the well and anchored to the ocean floor by means including chains. The circular wall structure is floated on the water by means of pontoons encircling the wall and secured preferably to the outside face of the wall. The wall structure extends above and below the surface of the water to act as a positive confining enclosure adapted to retain oil escaping or leaking from around the well casing during the drilling operation, or afterward, when the well is under productive operation. The series of pontoons secured around the wall structure are all interconnected by a pair of supply lines which provide continuous communication between the pontoons. The circular wall structure may be raised or lowered in the water by controlling the buoyancy of the pontoons, which is accomplished by displacing the air contained in the pontoons with sea water. The buoyancy of the pontoons is regulated through floating valve mechanism located on a platform outside the circular wall whereby a vessel desiring access to the oil well rig may lower the circular wall in the water by making connection with the valve mechanism and pump sea water into the pontoons to displace the air therein and cause the wall to sink. When the vessel has completed whatever operation or business was required on the rig, connection is again made with the control valves to pump air into the pontoons to displace the sea water and thereby float the pontoons and restore the confining wall to the level desired. The floating valve mechanism is operatively connected with the interconnected pontoons by a pair of flexible lines which provide for the introduction of water and the removal of air or vice versa depending upon whether the wall structure is being lowered or raised.

OBJECTS OF THE INVENTION

The primary purpose of this invention is related to water pollution control by preventing the escape of leaking oil from an offshore oil well installation.

The principal object of the invention is to provide a generally circular confining wall around an offshore oil well and to anchor the wall concentrically in relation to the well.

An important object of the invention is the provision of a generally circular confining wall around an offshore oil well including flotation devices for supporting the wall in a body of water.

A further object of the invention is to provide a generally circular confining wall around an offshore oil well having flotation devices for supporting wall with means for regulating the buoyancy of the flotation devices to raise or lower the wall in a body of water.

Another object of the invention is the provision of a generally circular confining wall around an offshore oil well having a series of interconnected supporting pontoons attached to the wall and a floating control mechanism located outside the wall whereby air or water may be pumped into the pontoons to raise or lower the wall in a body of water.

Another object of the invention is to provide a confining wall structure around an offshore oil well installation that is fabricated from a series of plates in edge to edge relation and welded together to provide a generally circular wall extending continuously around the well.

DESCRIPTION OF THE DRAWINGS

The foregoing and other and more specific objects of the invention are attained by the structure and arrangement illustrated in the accompanying drawings wherein FIG. 1 is a general perspective view of an offshore oil well installation equipped with the surrounding generally circular confining wall structure of this invention; and FIG. 2 is an elevational view of the offshore oil well with the confining wall lowered in the body of water to permit surface access to the centrally disposed rig.

DESCRIPTION OF PREFERRED EMBODIMENT

In the drawings 10 represents an offshore oil well rig installation including a derrick 11, one or more platforms 12 as well as all of the usual elements found in wells of this type such as the well house, the tackle for boring, hoisting or lowering and the equipment for handling the well casing sections. As shown in FIG. 2, the well casings 13 are depicted as extending through the ocean floor 14 in drilling for underlying oil and which subsequently to the drilling operation would represent the means by which the oil is withdrawn by pumping means in the rig 10. As shown also in this figure, it will be seen that oil sometimes leaks from around the wellhead 15 and escapes upwardly through the water to the surface and unless this seepage is confined and recovered an oil slick results which may deleteriously affect the shoreline or wildlife of other things with which it may come in contact or be enveloped thereby.

In order to confine the escaping oil this invention provides a generally circular wall structure 16 surrounding and enclosing the rig 10. This wall is comprised of a series of metal plates 17 arranged in edge to edge relationship and integrally secured together by welding as at 18 to provide a continuous wall of leak-proof construction extending entirely around the rig 10 at a distance therefrom such as to catch any and all escaping oil floating upwardly from the wellhead 15 within the area enclosed by the wall. The wall 16 is of a vertical depth such as to extend above the surface of the water to provide a basin for the collection of the escaping oil and extends below the surface as well so that all of the oil that escapes from the wellhead is positively confined within the enclosure formed by the circular wall.

The wall structure 16 is supported by pontoons 19 which are disposed around the perimeter of the wall structure and secured to the outside face of the wall at substantially equally spaced intervals so that the entire wall structure floats in the water supported by the buoyancy of the pontoons. The wall structure is disposed in concentric relationship with respect to the rig 10 and this relationship is maintained by anchoring devices arranged at equally spaced intervals around the wall. The anchoring devices include chains 20 which are secured to the wall structure 16 adjacent to the lower area thereof and extend downwardly to the anchors 29 fixed in the ocean floor 14 and to which the chains are also secured. Thus, the circular wall 16 is confined to a generally concentric position with respect to the rig 10, but because of the highly flexible nature of the restraining chains 20, may be lowered into the water for the passage of ships approaching the central rig, or raised to operative position concentrically around the rig, without any adverse effect on the positioning or operation of the confining wall.

A floating platform 21 is provided in the sea outside the combined area encircled by the wall 16 so that the platform is always accessible by boat from outside the wall. One or more pontoons 22 may be utilized to maintain the buoyancy of the platform on the surface of the sea. Valve mechanism 23 is provided on the platform with the controls on the upper side thereof whereby connection can be made to lines 24 and 25 by a ship such as a tanker, or the like, from the sea area surrounding the wall 16. The lines 24 and 25 have operative connection with the series of pontoons 19 supporting the wall 16 and are shown as being connected respectively with lines 26 and 27 extending between the various adjoining pontoons, but it is contemplated that the lines 24 and 25 might be connected to one or more of the pontoons, if desired, and achieve their purpose. The lines 26 and 27 connect all of the pontoons 19 in a continuous series so that all of the pontoons are fully in communication one with the other entirely around the wall 16.

When the wall 16 is in its operative raised position around the rig 10 and an approaching ship requires access to the rig the ship, such as a tanker, first goes to the floating platform 21 and makes operative connection with the lines 24 and 25 through the control valve mechanism 23. If the basin formed by the wall structure around the central rig does not contain any oil the ship pumps sea water into the pontoons through the lines 24 and 25 with the connecting lines 26 and 27 providing "in-and-out" communication between all of the pontoons. When sufficient air has been displaced from the pontoons by sea water to reduce their buoyancy the level of the wall structure 16 will be lowered in the water and thereby enable the ship to pass over the wall and go to the rig 10. When the ship has completed its business at the central rig it again passes over the wall on its way out and again makes connection with the lines 24 and 25 through the control mechanism 23 and blows out the pontoons 19. Filling the pontoons with air causes the wall 16 to rise again above the level of the sea and thereby form a basin around the rig to collect and confine the oil which leaks from the wellhead 15.

The wall structure is illustrated in FIG. 2 in a lowered position, as shown in full lines, with the normal operative position raised above the level of the sea, being indicated in broken lines. When the basin formed by the confining wall contains a substantial volume of oil the level of the wall should not be lowered until the confined oil has been removed from the basin. When the basin contains oil this can be pumped out of the basin into a tanker and hauled away for processing. This operation can be performed at any time that sufficient oil has accumulated in the basin to warrant its removal but the operation can also be completed at the time an approach to the rig 10 must be made. In this latter event a tanker would first pump the oil out of the basin into its hold and then go to the platform 21 to make the connection to the pontoons 19 through the lines 24 and 25 and pump sea water into the pontoons to lower the wall. The tanker would pass over the wall on its way to the central rig, complete whatever business was necessary at the rig and on the way out again pass over the lowered wall and connect up with the lines 24 and 25 to blow out the pontoons with air and thereby cause the confining wall to be restored to operative position.

The pontoons 19 are located on the confining wall structure 16 at a position to float the wall in the sea, with the top edge thereof at a level sufficiently above the surface to form the basin for collecting the escaping oil, and this positioning of the pontoons on the wall might be varied in accordance with particular conditions at a well site and preferences as to the amount of oil to be collected in the basin before signalling the necessity for removing the collected oil from the basin. A transmitting type signal 28 is mounted on the inside face of the wall structure 16 within the enclosure to be responsive to the level of the oil in this basin. When a predetermined level has been reached, the signal 28 will beam a radio wave to a selected location where this information will bring forth the equipment for removing the accumulated oil from the basin.

The wall structure 16, being constructed from a plurality of adjoining plates welded edge to edge, can be fabricated at the site of the offshore oil well but it is contemplated also that the complete wall structure might be fabricated at some distant location on shore and the completed structure, including the pontoons assembled thereon, brought to the offshore well location by helicopters and lowered into the water around the rig 10 and anchored.

From the foregoing it will be seen that there has been provided a highly effective offshore oil confining structure for use around an offshore oil well drilling operation or a producing oil well and which can be adjusted in the water to enable ships to pass over the wall for access to a central rig or raised above the water level to form an oil confining basin.

What is claimed is:

1. An offshore oil well enclosure for confining leaking oil from the well comprising a generally circular wall surrounding said well, means for floating said wall in a body of water, including a plurality of pontoons operatively connected to the wall, means for sinking said wall beneath the level of said body of water, means to anchor the floating circular wall to the floor beneath said body of water in generally concentric relation to said well, said means for sinking said wall including floating valve mechanism located exteriorly of said wall and one or more connecting lines from said valve mechanism to said pontoons, said pontoons being located around a face of said wall and interconnected by a pair of lines providing communication between all of the pontoons, said connecting lines from said valve mechanism having communication with the pair of lines interconnecting the pontoons, said valve mechanism being mounted on a floating platform located outside said circular wall whereby a vessel may approach said platform mechanism to sink said wall for access to said well, said circular wall being comprised of a series of plates secured together to provide a continuous enclosure around said well for confining oil on the surface of said body of water and said plates being permanently secured together by welding their respectively adjoining edges to each other, and said pontoons encircle said wall and are supportingly mounted on the outside face of the wall.

2. An offshore oil well enclosure as set forth in claim 1 wherein said means to anchor the floating circular wall includes a plurality of chains connected to said wall and to anchor devices secured to said floor.

3. An offshore oil well enclosure as set forth in claim 1 wherein signal transmitting means is provided on said enclosure on the inside face of said wall to signal the presence of oil therein.

* * * * *